(12) United States Patent (10) Patent No.: US 9,312,082 B2
Milholland et al. (45) Date of Patent: Apr. 12, 2016

(54) MECHANICAL INTERLOCK STRUCTURE FOR SWITCHGEAR

(71) Applicant: ABB Technology AG, Zurich (CH)

(72) Inventors: Bill P. Milholland, Forence, SC (US); Lilia Aviles, Florence, SC (US)

(73) Assignee: ABB Technology AG, Zurich (CH)

( * ) Notice: Subject to any disclaimer, the term of this patent is extended or adjusted under 35 U.S.C. 154(b) by 264 days.

(21) Appl. No.: 14/104,000

(22) Filed: Dec. 12, 2013

(65) Prior Publication Data

US 2015/0170849 A1 Jun. 18, 2015

(51) Int. Cl.
*H02B 11/133* (2006.01)
*H01H 9/24* (2006.01)
*H02B 11/167* (2006.01)

(52) U.S. Cl.
CPC ............... *H01H 9/24* (2013.01); *H02B 11/133* (2013.01); *H01H 2221/052* (2013.01); *H02B 11/167* (2013.01)

(58) Field of Classification Search
CPC ........ H01H 9/24; H02B 13/00; H02B 11/133; H02B 11/167
USPC ............ 200/50.21–50.28; 218/7, 114, 78, 53, 218/154
See application file for complete search history.

(56) References Cited

U.S. PATENT DOCUMENTS 6,545,234 B1 * 4/2003 Trivette ................ H01H 33/666
200/50.21

* cited by examiner

*Primary Examiner* — Amy Cohen Johnson
*Assistant Examiner* — Marina Fishman
(74) *Attorney, Agent, or Firm* — Manelli Selter PLLC; Edward J. Stemberger

(57) ABSTRACT

An interlock structure is coupled between actuating structure and a travel adjuster of a circuit breaker. The interlock structure includes a body having a bore therein. An engaging member has a portion sized to be received by the bore and the engaging member is coupled with the travel adjuster for movement therewith. A slide member is movable with respect to the body between operative and inoperative positions. Linkage structure is coupled to the slide member for moving the slide member and is also coupled to the actuating structure such that upon movement of the actuating structure, the linkage structure moves the slide member to the operative position so that the slide member blocks at least a portion of the bore to prevent the engaging member from entering the bore and thus prevents the travel adjuster from moving in a certain direction to allow the closure of the circuit breaker contacts.

18 Claims, 6 Drawing Sheets

MECHANICAL INTERLOCK STRUCTURE FOR SWITCHGEAR

FIELD

The invention relates to switchgear circuit breakers and, more particularly, to a mechanical interlock structure that prevents mechanical movement of the primary contacts into a closed position.

BACKGROUND

Safety interlocks are the mechanisms used in circuit breakers that coordinate its safety function with its operating function. The parameters and requirement of this coordination are dictated by the ANSI/IEEE standards C37. Specific to this scope, there are two types of interlock required; mechanical and electrical. Mechanical interlocking prevents the mechanical closing of the primary contacts unless the primary disconnecting devices are in full contact or separated by a safe distance. Electrical interlocking prevents electrical operating of the primary contacts into a closed position. Conventional interlocking can be achieved in many ways given the various input/output requirements of the system.

There is a need to provide a more robust mechanical interlock structure that requires few parts, is modular across replacement circuit breaker platforms and is cost-effective.

SUMMARY

An objective of the invention is to fulfill the need referred to above. In accordance with the principles of the present invention, this objective is achieved by providing a circuit breaker equipped with a circuit breaker module including contacts and a travel adjuster associated with the contacts such that when the circuit breaker module effects a closing position, the travel adjuster moves in a certain direction to permit the contacts to close. Interlock structure is coupled with the travel adjuster and has an engaging member that moves with the travel adjuster. The interlock structure further includes a slide member and linkage structure. The linkage structure is constructed and arranged to move the slide member between operative and inoperative positions. Actuating structure is coupled with the linkage structure and is constructed and arranged to move the linkage structure and thus the slide member 1) to the operative position to prevent the engaging member and thus the travel adjuster from moving in the certain direction to prevent closure of the contacts, and 2) to the inoperative position to permit the engaging member and thus the travel adjuster to move in the certain direction to permit closure of the contacts.

In accordance with another aspect of an embodiment, a mechanical interlock structure for a circuit breaker is provided. The interlock structure is constructed and arranged to be coupled between actuating structure and a travel adjuster of the circuit breaker. The interlock structure includes a body having a bore therein. An engaging member has a portion sized to be received by the bore and the engaging member is constructed and arranged to be coupled with the travel adjuster for movement therewith. A slide member is movable with respect to the body between operative and inoperative positions. Linkage structure is coupled to the slide member for moving the slide member. The linkage structure is constructed and arranged to be coupled to the actuating structure such that upon movement of the actuating structure, the linkage structure moves the slide member to the operative position so that a portion of the slide member blocks at least a portion of the bore to prevent the portion of the engaging member from entering the bore and thus prevents the travel adjuster from moving in a certain direction. Upon different movement of the actuating structure, the linkage structure moves the slide member to the inoperative position so that the portion of the slide member is in a position to permit the portion of the engaging member to enter the bore so that the travel adjuster can move in the certain direction.

In accordance with another aspect of an embodiment, a method of controlling closure of primary contacts of a circuit breaker is provided. The circuit breaker has a travel adjuster associated with the contacts such that when the circuit breaker effects a closing position, the travel adjuster moves in a certain direction to permit closure of the contacts. The circuit breaker further includes actuating structure. The method couples interlock structure with the travel adjuster. The interlock structure has an engaging member that moves with the travel adjuster. The interlock structure further includes a slide member and linkage structure. The linkage structure is constructed and arranged to move the slide member between operative and inoperative positions. The linkage structure is coupled to actuating structure. The actuating structure is moved to move the linkage structure and thus the slide member to the operative position to prevent the engaging member and thus the travel adjuster from moving in a certain direction to prevent closure of the contacts. The circuit breaker is then moved to a connected position. The actuating structure is moved again to move the linkage structure and thus the slide member to the inoperative position to permit the engaging member and thus the travel adjuster to move in the certain direction to permit closure of the contacts.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENT

Figure 1:
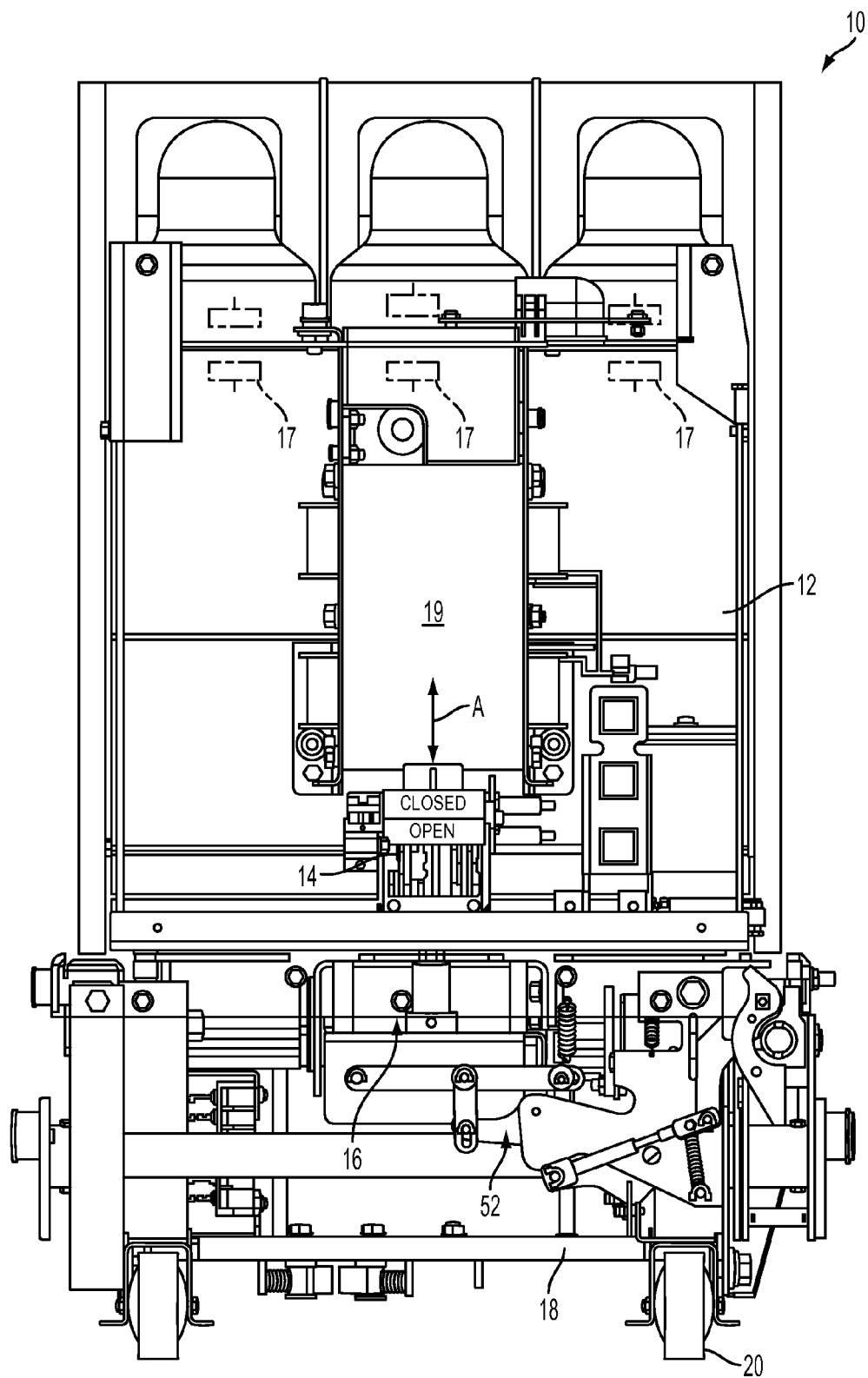
FIG. 1 is a front view of a replacement circuit breaker in accordance with an embodiment and shown with front covers removed for clarity of illustration.
Figure 2:
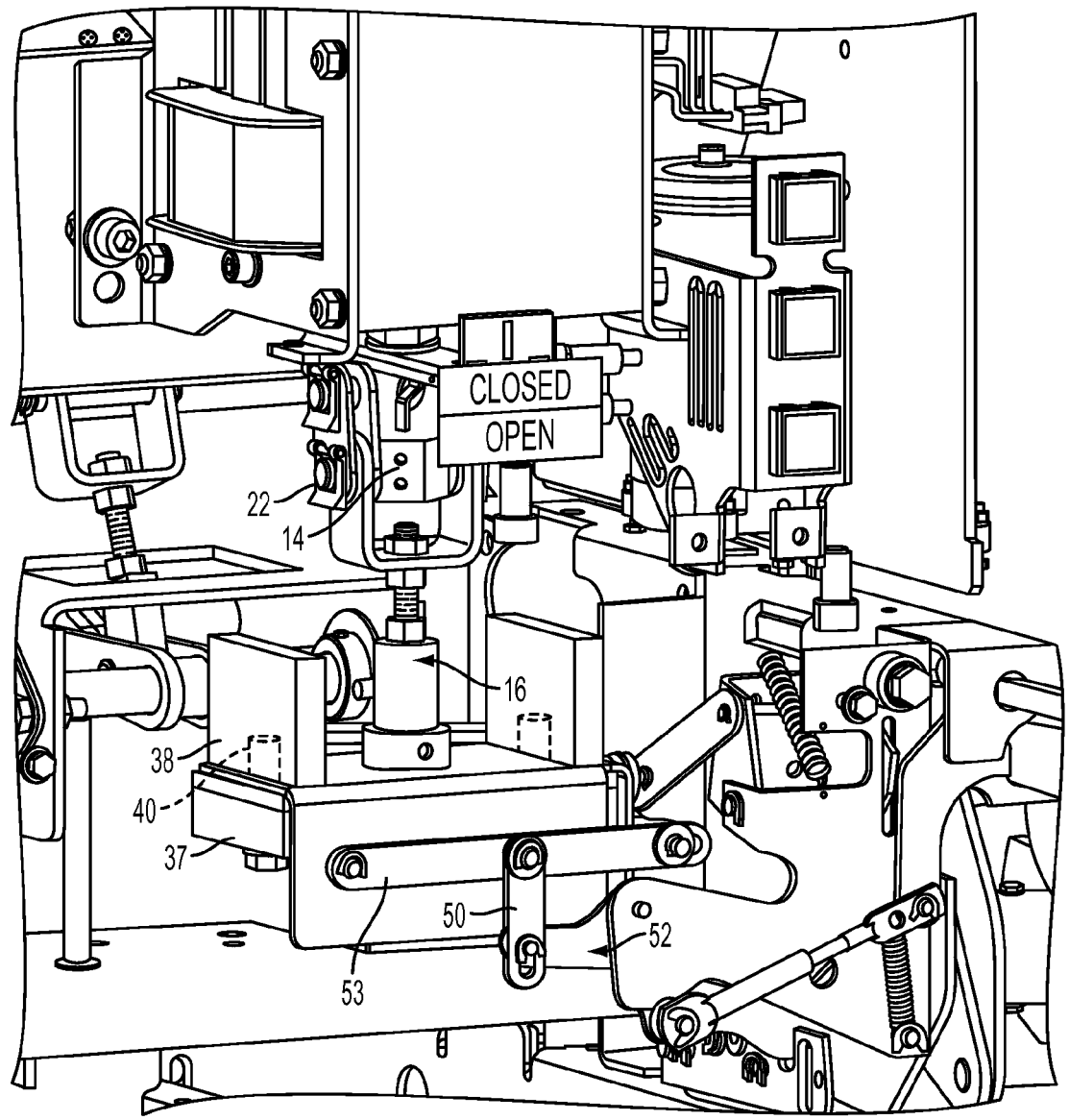
FIG. 2 is an isometric view showing a travel adjuster coupled to a mechanical interlock structure of the circuit breaker of FIG. 1.

With reference to FIG. 1, a circuit breaker is shown, generally indicated at 10, in accordance with an embodiment. The circuit breaker 10 is preferably a replacement type 5KV-250MVA-1200A circuit breaker, such as the HK replacement circuit breaker of ABB. The circuit breaker 10 includes a conventional circuit breaker module 12 constructed and arranged to make, carry, and break currents under normal conditions, and make and carry currents for a specified time and to break currents under specified abnormal circuit conditions such as a short circuit. As best shown in FIG. 2, the module 12 includes a conventional travel adjuster 14 constructed and arranged such that with the circuit breaker module 12 effects a closing position, the travel adjuster 14 actuates downwardly (along axis A) over a set distance, 16, thereby permitting an operating mechanism (not shown) of the circuit breaker 10 to effect a closed position of contacts 17 of the module 12. The travel adjuster is coupled to the contacts 17 by linkages of the operating mechanism, typically actuated by a magnetic actuator 19.

When the replacement circuit breaker 10 is being racked into a switchgear (not shown) a mechanical interlock structure, generally indicated at 16, is required to prevent the circuit breaker module 12 from closing. As shown in FIG. 1, the mechanical interlock structure 16 of the embodiment is part of the replacement truck frame 18. The truck frame 18 is movable due to rollers 20 and the module 12 is carried by the truck frame 18.

Figure 3:
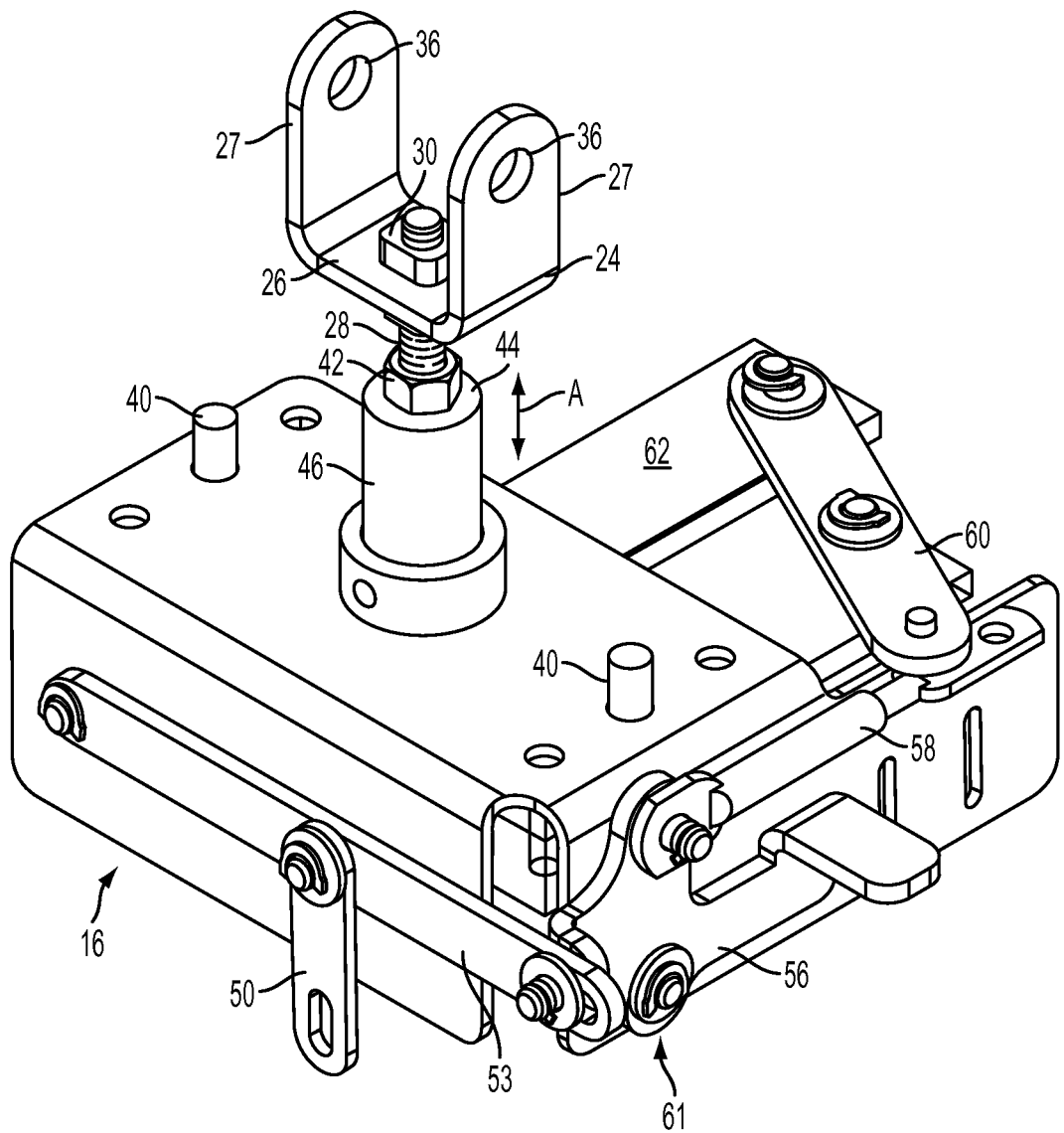
FIG. 3 is an isometric view of the mechanical interlock structure of FIG. 2.

With reference to FIG. 2, the travel adjuster 14 is fixed to the new mechanical interlock structure 16 by a pin 22 or the like. In particular, as shown in FIG. 3, the mechanical interlock structure 16 includes a generally U-shaped flange 24 having a base 26 and a pair of opposing arms 27 coupled thereto. An adjustment screw 28 is coupled to the base 26 via a nut 30. Opposing arms 27 of the flange 24 include aligned bores 36 there-through. With reference to FIG. 2, the pin 22 passes through the bores 36 and bores in the travel adjuster 14 to connect the travel adjuster 14 to the flange 24. A body 37 of the mechanical interlock structure 16 is fixed to a portion 38 of the truck frame 18, preferably by hex head cap screws 40. The adjustment screw 28 is provided between the flange 24 and an engaging member 46 of the interlock structure 16. The height of the bores 36 can be adjusted along axis A by moving of the adjustment screw 28 with respect to the engaging member 46 and then securing the screw 28 by a nut 42 that is engaged with a surface 44 of the engaging member 46. The adjustment screw 28 permits proper positioning of the flange 24 with respect to the travel adjuster 14.

Figure 5:
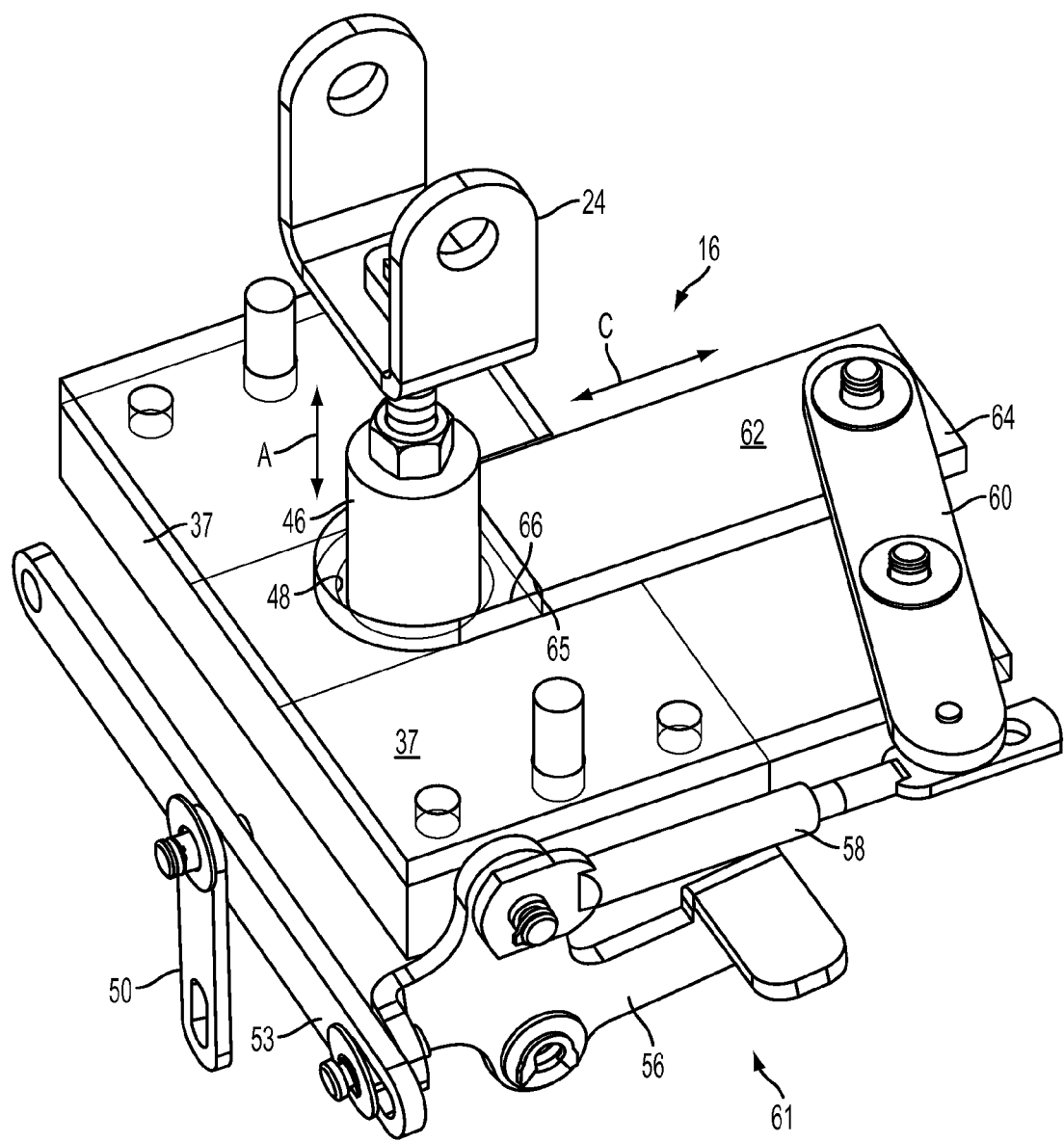
FIG. 5 is an isometric view of the mechanical interlock structure of FIG. 3, shown with a transparent top cover for clarity of illustration and with a slide member in an inoperative, disengaged position.

As best shown in FIG. 5, the body 37 of the interlock structure 16 includes a bore 48 there-through that is sized to receive a portion of the engaging member 46. Thus, the engaging member 46 is movable along axis A together with the flange 24 and the connected travel adjuster 14. FIG. 5 shows a cylindrical end portion of the engaging member 46 passing through the bore 48, the function of which will be explained below.

Figure 6:
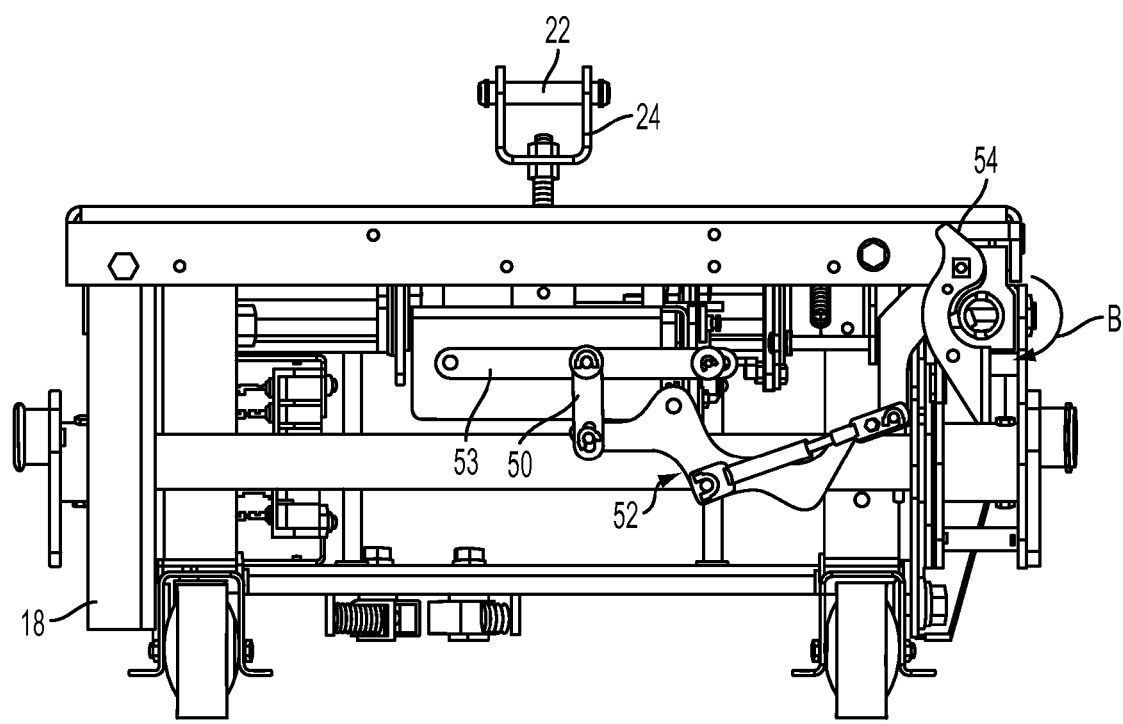
FIG. 6 is a front view of the truck frame of the circuit breaker of FIG. 1, showing actuating structure associated with the mechanical interlock structure and shown disconnected with the travel adjuster.

The mechanical interlock structure 16 includes a coupling link 50 that is pivotally coupled to actuating structure, generally indicated at 52, of the frame truck 18 (see FIGS. 2 and 6) and pivotally coupled to a lever arm 53. In particular, and as best shown in FIG. 6, rotation (see arrow B) of a racking handle 54 of the actuating structure 52 causes rotation of the coupling link 50, which causes rotation of the lever arm 53. A crank arm 56, coupled to the lever arm 53, transfers this rotational motion to linear motion of a connection rod 58 coupled to the crank arm 56. A close arm 60 is pivotally coupled between the connection rod 58 and a slide member 62. In the embodiment, the slide member 62 is an elongated plate with opposing ends 64, 65 that is slidable in an elongated recess 66 (FIG. 5) defined in the body 37. The recess 66 is in communication with the bore 48 and is disposed generally transversely with respect to an axis D of the bore 48. The linear movement of the connection rod 58 causes rotation of the close arm 60, which causes linear movement of the slide member 62 in the linear directions of arrow C in FIG. 5. The coupling link 50, lever arm 53, crank arm 56, connection rod 58, and close arm 60 can be considered to be part of linkage structure, generally indicted at 61, of the interlock structure 16 for moving the slide member 62 due to movement of the actuating structure 52.

A "connected position" of a switchgear assembly removable element (e.g., circuit breaker 10) is the position of the removable element in which both primary and secondary disconnecting devices are in full contact. A "test position" of a switchgear assembly removable element is a position in which the primary disconnecting devices of the removable element are separated by a safe distance, and some or all of the secondary disconnecting devices may be in operating contact. The interlock structure 16 is constructed and arranged such that a closed breaker cannot be moved into or out of the connected position and if the breaker is not in any of the defined disconnect, test or connected positions, it may not be closed.

Figure 4:
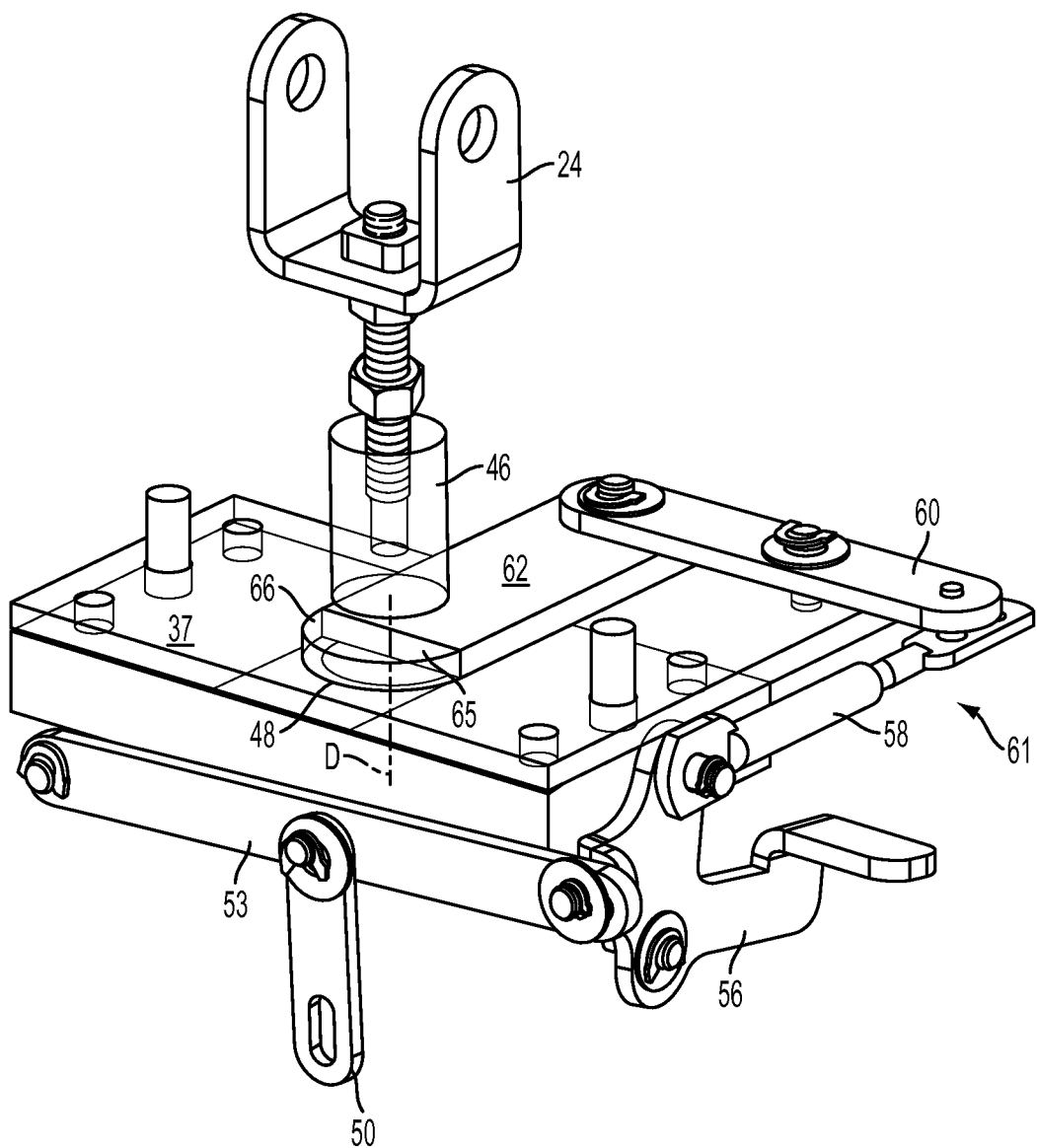
FIG. 4 is an isometric view of the mechanical interlock structure of FIG. 3, shown with a transparent top cover for clarity of illustration and with a slide member in an operative, engaged position.

When the circuit breaker module 12 effects a close operation outside the proper "test position" or connected position", with reference to FIG. 4, movement of the actuating structure 52 causes the linkage structure 61 to move the slide member 62 linearly in a first direction in the recess 66 so that end 65 thereof blocks the bore 48 in the body 37. In this operative position of the slide member 62, end 65 is engaged by the engaging member 46, preventing downward movement of the engaging member 46 and thus the connected travel adjuster 16, thereby preventing the circuit breaker 10 from effecting a closed position of the contacts 17. In this position of the interlock structure 16, it is safe to rack (install) the replacement circuit breaker 10.

Once the circuit breaker 10 is installed, the handle 54 can be rotated in a different manner, permitting the actuating structure 52 to cause the linkage structure 61 to move the slide member 62 linearly in a second direction that is opposite the first direction, in the recess 66 so that end 65 does not block the bore 48 in the body 37. This inoperative position of the slide member 62 permits downward movement of the engaging member 46 into the bore 48 and thus permits downward movement of the connected travel adjuster 16, thereby permitting the circuit breaker 10 to effect a closed position of the contacts 17. Thus, linkage structure 61 is constructed and arranged such that when the slide member 62 moves between the operative and inoperative positions, the slide member 62 moves generally transversely with respect to the engaging member 46 and thus the travel adjuster 16.

The interlock structure 16 provides a more robust shear-style interlock that requires fewer parts and less maintenance. The interlock structure 16 also permits a modular application across replacement circuit breaker platforms upon changing the flange 24.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A circuit breaker comprising:
   a circuit breaker module including contacts and a travel adjuster associated with the contacts such that when the circuit breaker module effects a closing position, the travel adjuster moves in a certain direction to permit the contacts to close,
   interlock structure coupled with the travel adjuster and having an engaging member that moves with the travel adjuster, the interlock structure further including a slide member and linkage structure, the linkage structure being constructed and arranged to move the slide member between operative and inoperative positions, and
   actuating structure coupled with the linkage structure and constructed and arranged to move the linkage structure and thus the slide member 1) to the operative position to prevent the engaging member and thus the travel adjuster from moving in the certain direction to prevent closure of the contacts, and 2) to the inoperative position to permit the engaging member and thus the travel adjuster to move in the certain direction to enable closure of the contacts,
   wherein the linkage structure is constructed and arranged such that when the slide member moves between the operative and inoperative positions, the slide member moves generally transversely with respect to the engaging member and thus the travel adjuster.

2. The circuit breaker of claim 1, wherein the interlock structure includes a body having a bore therein that is sized to receive a portion of the engaging member such that when the slide member is in the operative position, a portion of the slide member blocks at least a portion of the bore to prevent the portion of the engaging member from entering the bore, and in the inoperative position of the slide member, the portion of the slide member is in a position to permit the portion of the engaging member to enter the bore so that the travel adjuster can move in the certain direction.

3. The circuit breaker of claim 2, wherein the interlock structure and the actuating structure are part of a wheeled truck frame.

4. The circuit breaker of claim 3, wherein the interlock structure further includes a flange coupled to the travel adjuster and an adjustment screw coupled between the flange and the engaging member so that a position of the flange with respect to the travel adjuster can be adjusted.

5. The circuit breaker of claim 2, wherein the linkage structure comprises:
   a coupling link pivotally coupled to the actuating structure,
   a lever arm pivotally coupled to the coupling link,
   a crank arm coupled to the lever arm,
   a connection rod coupled to the crank arm, and
   a close arm pivotally coupled between the connection rod and the slide member, such that movement of the actuating structure causes rotation of the coupling link, which causes rotation of the lever arm, with the crank arm transferring this rotational motion to linear motion of the connection rod, which causes rotation of the close arm, causing linear movement of the slide member between the operative and inoperative positions thereof.

6. The circuit breaker of claim 4, wherein the flange is of generally U-shape having a pair of opposing arms coupled to a base, the base being coupled to the adjustment screw, the arms being coupled to the travel adjuster by a pin connection.

7. The circuit breaker of claim 2, wherein the slide member is an elongated plate and the interlock structure includes a body having an elongated recess, the recess being in communication with bore, the plate being movable in the recess so that in the operative position, an end of the plate blocks at least a portion of the bore.

8. A mechanical interlock structure for a circuit breaker, the interlock structure being constructed and arranged to be coupled between actuating structure and a travel adjuster of the circuit breaker, the interlock structure comprising:
   a body having a bore therein,
   an engaging member having a portion sized to be received by the bore, the engaging member being constructed and arranged to be coupled with the travel adjuster for movement therewith,
   a slide member movable with respect to the body between operative and inoperative positions, and
   linkage structure coupled to the slide member for moving the slide member, the linkage structure being constructed and arranged to be coupled to the actuating structure such that upon movement of the actuating structure, the linkage structure moves the slide member to the operative position so that a portion of the slide member blocks at least a portion of the bore to prevent the portion of the engaging member from entering the bore and thus prevents the travel adjuster from moving in a certain direction, and upon different movement of the actuating structure, the linkage structure moves the slide member to the inoperative position so that the portion of the slide member is in a position to permit the portion of the engaging member to enter the bore so that the travel adjuster can move in the certain direction.

9. The interlock structure of claim 8, wherein the body includes an elongated recess in communication with the bore, the recess being disposed generally transversely with respect to an axis of the bore, the slide member being an elongated plate movable in the recess so that in the operative position, an end of the plate blocks at least a portion of the bore.

10. The interlock structure of claim 8, wherein the linkage structure is constructed and arranged such that when the slide member moves between the operative and inoperative positions, the slide member moves generally transversely with respect to the engaging member.

11. The interlock structure of claim 8, wherein the interlock structure further comprises a flange constructed and arranged to be coupled to the travel adjuster, and an adjustment screw coupled between the flange and the engaging member so that a position of the flange with respect to the travel adjuster can be adjusted.

12. The interlock structure of claim 11, wherein the flange is of generally U-shape having a pair of opposing arms coupled to a base, the base being coupled to the adjustment screw, the arms being constructed and arranged to be coupled to the travel adjuster by a pin connection.

13. The interlock structure of claim 8, wherein the linkage structure comprises:
   a coupling link constructed arranged to be pivotally coupled to the actuating structure,
   a lever arm pivotally coupled to the coupling link,
   a crank arm coupled to the lever arm,
   a connection rod coupled to the crank arm, and
   a close arm pivotally coupled between the connection rod and the slide member, such that rotation of the coupling link causes rotation of the lever arm, with the crank arm transferring this rotational motion to linear motion of the connection rod, which causes rotation of the close arm, causing linear movement of the slide member between the operative and inoperative positions thereof.

14. The interlock structure of claim 8, in combination with the travel adjuster and the actuating structure.

15. A method of controlling closure of primary contacts of a circuit breaker, the circuit breaker including a travel adjuster associated with the contacts such that when the circuit breaker effects a closing position, the travel adjuster moves in a certain direction to permit the contacts to close, the circuit breaker further including actuating structure, the method comprising:
   coupling interlock structure with the travel adjuster, the interlock structure having an engaging member that moves with the travel adjuster, the interlock structure further including a slide member and linkage structure, the linkage structure being constructed and arranged to move the slide member between operative and inoperative positions,
   coupling the linkage structure to the actuating structure, and
   moving the actuating structure to move the linkage structure and thus the slide member to the operative position to prevent the engaging member and thus the travel adjuster from moving in a certain direction to prevent closure of the contacts,
   moving the circuit breaker to a connected position, and
   moving the actuating structure to move the linkage structure and thus the slide member to the inoperative position to permit the engaging member and thus the travel adjuster to move in the certain direction to enable closure of the contacts,
   wherein the interlock structure includes a body having a bore therein that is sized to receive a portion of the engaging member such that when the slide member is in the operative position, a portion of the slide member blocks at least a portion of the bore to prevent the portion of the engaging member from entering the bore, and in the inoperative position of the slide member, the portion of the slide member is in a position to permit the portion of the engaging member to enter the bore so that the travel adjuster can move in the certain direction.

16. The method of claim 15, wherein the body includes an elongated recess in communication with the bore, the recess being disposed generally transversely with respect to an axis of the bore, the slide member being an elongated plate movable in the recess so that in the operative position, an end of the plate blocks at least a portion of the bore.

17. The method of claim 15, wherein the interlock structure further comprises a flange and an adjustment screw coupled between the flange and the engaging member, the step of coupling the interlock structure to the travel adjuster includes coupling the flange to the travel adjuster.

18. The method of claim 15, wherein the linkage structure comprises:
   a coupling link constructed arranged to be pivotally coupled to the actuating structure,
   a lever arm pivotally coupled to the coupling link,
   a crank arm coupled to the lever arm,
   a connection rod coupled to the crank arm, and
   a close arm pivotally coupled between the connection rod and the slide member, and wherein movement of the actuating structure causes rotation of the coupling link that causes rotation of the lever arm, with the crank arm transferring this rotational motion to linear motion of the connection rod, which causes rotation of the close arm, causing linear movement of the slide member between the operative and inoperative positions thereof.

* * * * *